Figure 1:
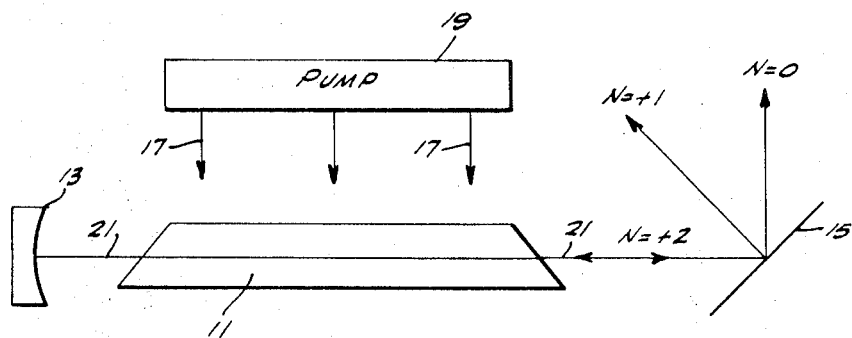

United States Patent

[11] 3,586,995

| [72] | Inventor | Richard A. Hubach |
| | | Canoga Park, Calif. |
| [21] | Appl. No. | 41,667 |
| [22] | Filed | May 21, 1970 |
| [45] | Patented | June 22, 1971 |
| [73] | Assignee | Hughes Aircraft Company |
| | | Culver City, Calif. |
| | | Continuation of application Ser. No. |
| | | 717,501, Apr. 1, 1968, now abandoned. |

[54] MULTIBEAM LASER
9 Claims, 2 Drawing Figs.

| [52] | U.S. Cl. | 331/94.5 |
| [51] | Int. Cl. | H01s 3/00 |
| [50] | Field of Search | 331/94.5 |

[56] References Cited
UNITED STATES PATENTS

| 3,248,660 | 4/1966 | Fajans | 331/94.5 |
| 3,443,243 | 5/1969 | Patel | 331/94.5 |
| 3,471,409 | 10/1969 | Lee et al. | 331/94.5 |

FOREIGN PATENTS

| 984,590 | 2/1965 | Great Britain | 331/94.5 |

Primary Examiner—Ronald L. Wibert
Assistant Examiner—Conrad Clark
Attorneys—James K. Haskell and John Holtricher, Jr.

ABSTRACT: This is a laser that provides two or more output beams directly from the laser resonant cavity and includes an active laser element disposed in a resonant cavity consisting of a substantially totally reflective mirror at one end and a specially designed and oriented grating element at the other end which diffracts incident laser radiation into three or more orders depending upon the number of output beams desired.

MULTIBEAM LASER

This is a continuation of application Ser. No. 717,501 filed Apr. 1, 1968.

In the past, only one output beam was produced by a laser and in order to obtain more than one beam, a beam-splitting element had to be placed in the beam path outside of the laser. This technique did provide the desired result but had at least two disadvantages. One disadvantage is that an additional component is required and the other is that this component comprises a semitransparent material that introduces undesired losses through absorption of energy.

Contrary to the prior art technique above described, the present invention couples laser radiation directly out of the laser resonant cavity in two or more components and has the advantage that no additional external and lossy components are utilized.

It is therefore and object of the present invention to provide an improved multibeam laser that is simple and economical to construct.

It is another object of the invention to provide a laser that produces two or more output beams having predetermined intensity relationships.

It is still another object of this invention to provide a multibeam laser that does not utilize external lossy components for beam splitting purposes.

These and other objects of the invention are provided in a multibeam laser comprising according to one embodiment of the invention an active laser element pumped by a source of pump energy and disposed in a regenerative laser cavity including a substantial total reflective mirror at one end and a diffraction grating having a predetermined orientation and grating parameters that will diffract radiation into a predetermined number of orders.

Figure 2:
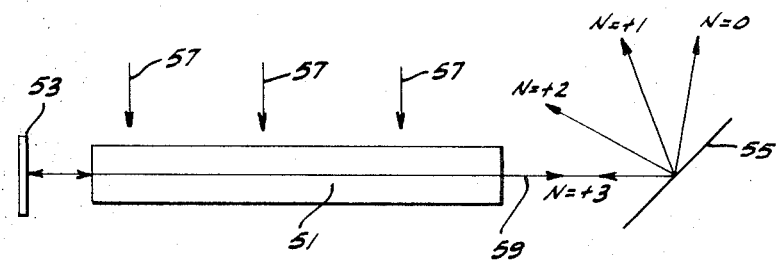

The invention and specific embodiments thereof will be described hereinafter by way of example and with reference to the accompanying drawing wherein like reference numerals indicate like elements or parts, and in which:

FIG. 1 is a schematic representation of the invention showing a two-beam output; and FIG. 2 is a schematic representation of another embodiment of the invention wherein a three-beam output is obtained.

With reference now to the drawing and more particularly to FIG. 1, there is shown an active laser element 11 disposed in a laser regenerative cavity comprising a substantially totally reflective spherical mirror 13 and a specially chosen and oriented diffraction grating 15. The laser element 11 may be of any laser material in any physical state such as, for example, a neodymium solid-state element or a $CO_2$ gas element. Appropriate pumping means, of course, is coupled to the active laser element to excite it to a lasing state. Such pumping is now well known in the art and will not here be described in detail except to note that solid ruby elements are generally excited by optical frequency pump sources such as flash lamps, and gas-type elements are generally pumped by electromagnetic sources or direct-current discharges within the gas. For simplicity, the pump energy will here be represented by arrows 17 emanating from a pump source 19.

In the past, gratings have been used in laser cavities as frequency selection or mode selection elements but not for obtaining two or more output beams. In order to obtain this desirable result, the grating parameters and orientation with respect to the incident beam must be judiciously selected. Thus, where a two-beam output is desired as shown in FIG. 1, for example, a grating must be constructed which diffracts radiation into only three orders such as +2, +1, 0 or −2, −1, 0 and the grating must be oriented so that the incident radiation as identified here as line 21 is along the direction of the blaze angle of either the +2 or −2 order.

The selection of grating parameters and orientation of the grating are based on an equation by Henry A. Rowland for the intensity as a function of wavelength, groove form, etc., for triangular grooves as first described in "Gratings in Theory and Practice" in Astron and Astrophysics 12, 129—149 (1893) and others. Also, a more recent article expanding on the Rowland equation can be seen in the Journal of the Optical Society of America, Vol. 36, No. 1, Jan. 1964, pages 2—12, by Robert F. Stamm and John J. Whalen, entitled "Energy Distribution of Diffraction Gratings as a Function of Groove Form."

By the use of the equation set forth on page 3 of the last referred-to article, it can be shown, for example, that for a $CO_2$ laser operating at $10.6\mu$ where it is desired to couple out of the laser an output of about 10 percent of the trapped radiation per incidence at the grating reflector 15, a grating having 50 grooves per millimeter and a first order blaze at $20\mu$ would be useful. When the grating 15 is oriented so that the regenerative energy represented here by the line 21 is along the $N=+2$ blaze direction as shown in FIG. 1, then an output beam of approximately 11.7 percent of the trapped energy is provided along the $N=+1$ direction and a second output beam of approximately 6.9 percent is provided along the $N=0$ direction. Again, it is to be stressed that the figures of the drawings are not shown to any scale and therefore the directional relationship shown between the various order lines and the grating is not intended to be accurate.

With reference to FIG. 3, here is shown an active laser element 51 that may be a neodymium rod, for example, disposed in a resonant laser cavity comprising a mirror 53 and a grating 55. Again, the laser element is pumped to a lasing state by a pump Source (not illustrated) producing pump energy as shown in the figure by arrows 59. The laser, once pumped, produces coherent laser energy along a regenerative path, here designated as line 57. The grating 55 in this embodiment of the invention is designed with reference to the Rowland equation so that there are only four orders of diffracted radiation. Under these conditions, there will be three output beam provided as shown.

Generally, the output beams that are provided as described for the invention are of varying intensities and the higher the intensity beam could be used, for example, for communications use or any other desired purpose while the lower energy beam or beams could be used to provide the power necessary to stabilize the laser frequency in any of various frequency stabilizing systems known in the art.

As has been indicated, the number of output beams desired and the intensity relationship between these various beams and between the beams and the trapped regenerative energy in the laser is calculable from the equation set forth on page 3 of the Stamm article. From the drawings of this specification and those shown in the referenced article, it can be seen that gratings may be constructed which diffract radiation into only a limited number of order. For the purposes of this invention, in order to provide the multibeam output desired, the incident light energy must be made to follow along one of the orders (either plus or minus) available.

From the foregoing, it will be evident that the invention provides an improved and highly efficient multibeam laser that does not require external, lossy elements for beam-splitting purposes.

Two embodiments of the invention have been illustrated and described herein, but it will be appreciated that other organizations of the specific arrangements shown may be made within the spirit and scope of the invention. For example, the spherical mirror 13 of FIG. 1 or the plane mirror 53 of FIG. 2 may be replaced by an other suitable type mirror such as a roof prism and any other suitable-type laser element and pumping means may be substituted for the ones shown.

Accordingly, it is intended that the foregoing disclosure and drawing shall be considered only as illustrations of the principles of this invention and are not to be construed in a limiting sense.

What I claim is:

1. A multibeam laser comprising:
   an active laser element;

pump means coupled to said laser element for exciting said element to a lasing state and generating laser energy of a predetermined wavelength along a regenerative path; and a laser regenerative cavity including a mirror at one end and a diffraction grating at the other end, said regenerative cavity defining a laser energy regenerative path in which is disposed said active laser element, said diffraction grating being constructed to have at least three blaze angle orders for laser energy of said predetermined wavelength, and said grating being oriented such that said regenerative path is along the direction of one of said blaze angle orders and portions of the laser energy in said regenerative path at said predetermined wavelengths are diffracted by said grating into a plurality of paths along the respective directions of the others of said blaze angle orders.

2. A multibeam laser according to claim 1, wherein said diffraction grating has an $N=+2$ order, an $N=+1$ order and an $N=0$ order, said regenerative path being along the direction of said $N=+2$ order and said plurality of paths being along the respective directions of said $N=+1$ order and said $N=0$ order.

3. A multibeam laser according to claim 1, wherein said diffraction grating has an $N=+3$ order, an $N=+2$ order, an $N=+1$ order and an $N=0$ order, said regenerative path being along the direction of said $N=+3$ order and said plurality of paths being along the respective directions of said $N=+2$ order, said $N=+1$ order and said $N=0$ order.

4. A multibeam laser according to claim 2, wherein said orders have the opposite sign.

5. A multibeam laser according to claim 3, wherein said orders have the opposite sign.

6. A multibeam laser according to claim 1, wherein said active laser element is neodymium glass and said pump means is a gaseous flashlamp.

7. A multibeam laser according to claim 1, wherein said active laser element is a $CO_2$ filled container and said laser energy is oscillating in the $10.6\mu$ region.

8. A multibeam laser according to claim 1, wherein said mirror is a substantially totally reflective spherical mirror.

9. A multibeam laser according to claim 1, wherein said mirror includes a flat reflective surface.